Patented Mar. 24, 1942

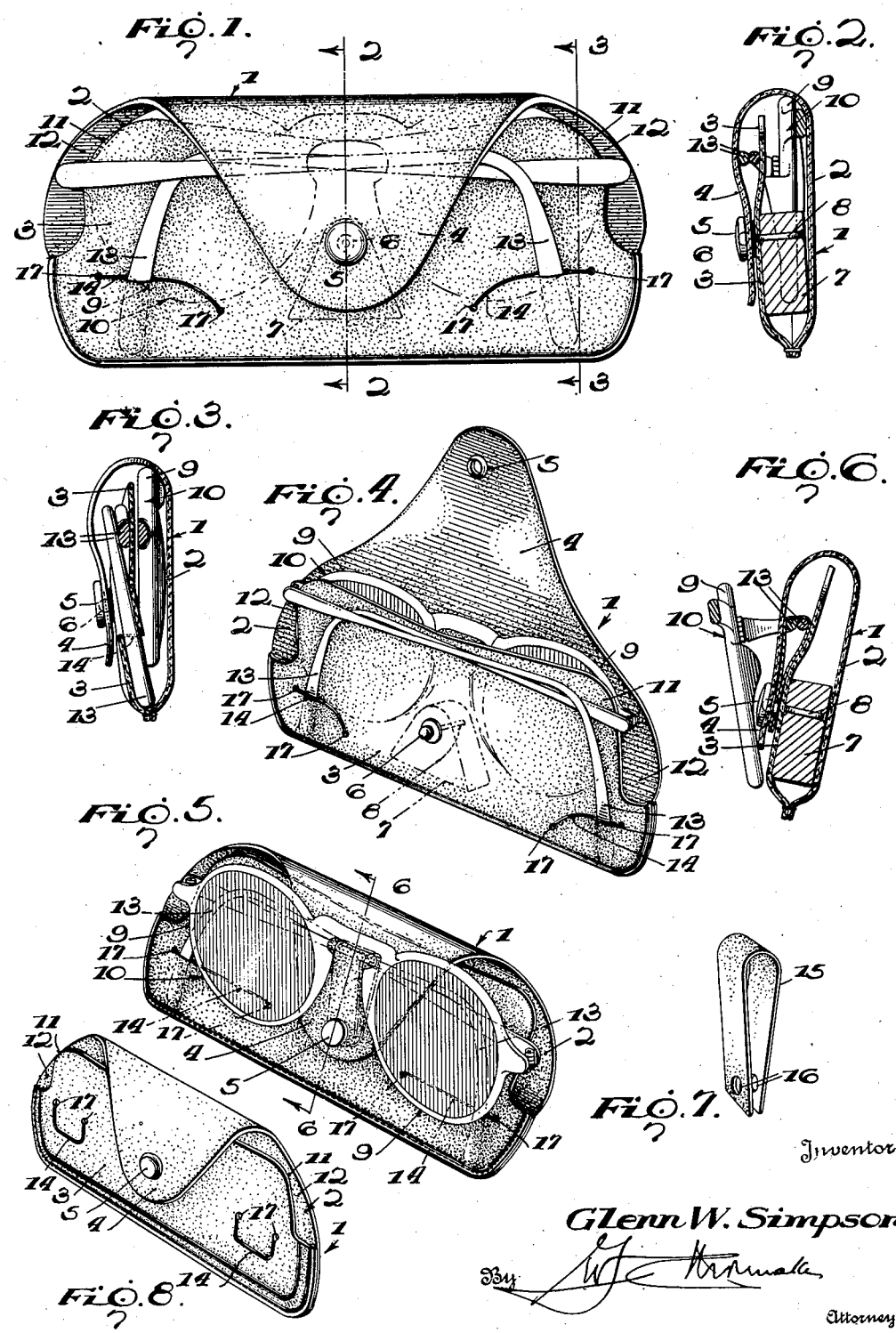

2,277,371

UNITED STATES PATENT OFFICE 2,277,371

SUNGLASS CASE

Glenn W. Simpson, Rochester, N. Y.

Application November 1, 1940, Serial No. 363,923

2 Claims. (Cl. 206—5)

The invention relates to a sun glass case.

An object of the present invention is to provide for sun glasses and other spectacles a simple, practical, and comparatively inexpensive case adapted to hold the rims and lenses of the glasses safely interiorly of the case between the front and rear walls thereof, with the temples or bows folded exteriorly of the front wall and securely confined between the front wall and the closure flap of the case and also with the free terminals of the temples or bows covered and protected to prevent the same from catching in the contents of a pocket in which the case may be placed.

A further object of the invention is to provide a sun glass case of this character having in its front wall slits arranged to receive the free terminals of the temples or bows, so that, while the folded temples or bows are located exteriorly of the front wall of the case between said front wall and the closure flap, the free terminals of the temples or bows will be housed within the case and prevented from protruding therefrom and becoming entangled in the contents of a pocket of the wearer of the glasses.

Another object of the invention is to provide a sun glass and spectacle case having the slits in its front wall arranged to cooperate with openings in the upper portions of the ends of the case so as to accommodate glasses and spectacles of different sizes without interfering with the proper arrangement of the rims and lenses between the front and rear walls of the case and the temples or bows exteriorly of the front wall and the free ends of the temples or bows interiorly of the case.

It is also an object of the invention to provide means cooperating with the slits of the front wall of the case and the closure thereof for maintaining sun glasses or other spectacles substantially wholly exteriorly of the case in a position for advantageously displaying the glasses.

Another object of the invention is to provide a discardable U-shaped loop member of paper or other inexpensive material adapted to be looped around the folded bows of the glasses and secured to the case by the fastening means of the closure flap for holding the glasses in a display position.

With these and other objects in view, the invention consists in the construction and novel combination and arrangement of parts hereinafter fully described, illustrated in the accompanying drawing and pointed out in the claims hereto appended, it being understood that various changes in the form, proportions and minor details of construction, within the scope of the claims, may be resorted to without departing from the spirit or sacrificing any of the advantages of the invention.

In the drawing:

Fig. 1 is a front elevation of a sun glass case having a pair of sun glasses arranged therein.

Fig. 2 is a central vertical sectional view taken on the line 2—2 of Fig. 1.

Fig. 3 is a similar view taken on the line 3—3 of Fig. 1.

Fig. 4 is a perspective view of the sun glass case with sun glasses arranged therein and the closure flap open.

Fig. 5 is a perspective view of the sun glass case having the sun glasses arranged exteriorly thereof in position for displaying the same.

Fig. 6 is a central vertical sectional view of the same.

Fig. 7 is a detail perspective view of the U-shaped loop member.

Fig. 8 is a perspective view of a sun glass case illustrating another form and arrangement of spaced slits to receive the terminal portions of the temples or bows of glasses or spectacles.

In the accompanying drawing in which is illustrated the preferred forms of the invention, 1 designates a sun glass case preferably constructed of flexible material such as leather or the like and comprising a rear wall 2 and a front wall 3 united at the lower edge and lower portions of the ends of the case with the rear wall. The rear wall is provided with a central extension forming a closure flap 4 which is foldable over the open top of the case and is secured to the front wall 3 by a snap fastener 5 preferably consisting of a female member mounted on the closure flap 4 and a male member 6 carried by the front wall 3.

A brace 7 of wood or other suitable material is preferably interposed between the front and rear walls and may be advantageously secured to the same by the shank 8 of the male member 6 of the fastening device, but any other suitable means may, of course, be employed for securing the brace 7 to the inner face of the front wall 3. The brace, which is tapered, is located centrally of the interior of the case and occupies a position below the bridge portion of the rim 9 of sun glasses 10.

The upper portions 11 of the front wall are cut away to provide openings 12 between the upper portions of the front and rear walls at the ends of the case, and the cutaway edges 11 extend downwardly from the upper edge of the front wall and are straight throughout the major portion of their length and are rounded at their upper ends and concave at their lower ends where they are united with the rear wall. The front and rear walls may be constructed of a single piece of material or be composed of two separate pieces secured together at the lower portion of the case.

The rim and lenses of the sun glasses 10 are placed within the case between the front and rear walls thereof and the cutaway end portions of the front wall permit the temples or bows to be folded against the exterior of the front wall and to be confined in their folded position by the closure flap 4 which is secured to the front wall by the fastening device 5. In order to cover, conceal, and thereby prevent the free ends of the temples or bows 13 from protruding or projecting from the case and catching in the contents of a pocket of the wearer of the glasses, the front wall is provided at its end portions with slits 14 which may converge downwardly as illustrated in Fig. 1 of the drawing or which may extend horizontally as illustrated in Fig. 5.

The slits, which are located in the lower portion of the front wall of the case, permit the free ends of the temples or bows to be passed through them into the interior of the case so that the front wall will form a guard or shield for the free ends of the temples or bows. By extending the slits 14 longitudinally of the case and by providing relatively large cut-outs at the edges 11, glasses of different sizes may be readily accommodated by the case.

When the lenses and rim of the glasses are arranged within the case and the temples or bows folded against the exterior of the front wall with their free ends inserted in the slits and the closure flap fastened, the glasses are safely and securely confined within the case and fully protected by the same, practically to the same extent as though the glasses including the bows were arranged wholly within the case. Also by arranging the glasses partially interiorly of the case and partly exteriorly thereof, a more compact case is provided than where it is necessary to place the glasses wholly between the front and rear walls of the case.

The case may also be employed for advantageously displaying sun glasses and other spectacles, which may be firmly held exteriorly of the case as illustrated in Figs. 5 and 6 of the drawing. For display purposes, the glasses are arranged exteriorly of the front wall of the case with the free ends of the bows or temples inserted in the slots 14 and the closure flap folded over the medial portions of the bows or temples and secured by the snap fastener. In order to maintain the glasses firmly in such display position, the folded bows are partially encircled by and confined within a U-shaped loop member 15 constructed of paper or other suitable inexpensive material and provided in its terminal portions with openings 16, through which the male member of the snap fastener is passed, and the sides of the loop member are confined on the male member of the snap fastener when the female member is snapped thereon.

The loop member is inexpensive and may be either discarded or used again and again for holding glasses on the case in the display position illustrated in Figs. 5 and 6. The loop member prevents the glasses from working upwardly from their display position and prevents any liability of the free ends of the temples or bows from becoming accidentally displaced from the slits in handling the glasses and cases when placing the same within and removing them from show cases or other places of display.

The slits which are shown curved and straight may be of any other desired form and may be located at any other convenient points than those shown in the drawing.

The slits 14, which may be arranged in various positions as the particular frame may require, terminate at each end in a small round hole 17, which will prevent the material from tearing.

In Fig. 8 of the drawing are illustrated slits 18 of approximately U-shape, composed of a substantially straight bottom portion and upwardly extending side or end portions. The slits 18 are cut in the lower corner areas of the front wall of the sun case. The U-shape slits 18 are conveniently disposed to receive the terminal portions of the temples or bows of glasses of different sizes.

What is claimed is:

1. A case of the glass described including a rear wall having a closure flap foldable over the front of the case, and a front wall provided at its end portions with slits, a fastening device for securing the closure flap in closed position and over the temples or bows when the same are folded and the glasses are arranged on the exterior of the case for displaying the same with the ends of the bows or temples arranged in said slits, and a loop member looped around the folded bows and having terminal portions engaged by the fastening device for securing the closure flap in its closed position.

2. A case of the character described comprising a rear wall having a closure flap foldable over the front of the case, a front wall provided at its end portions with slits, a snap fastener composed of male and female portions and adapted to secure the closure flap in its closed position, and a flexible strip adapted to be looped around the bows or temples of glasses when the bows or temples are folded and the glasses are arranged upon the case in a display position, said flexible strip being provided at its ends with openings adapted to receive the male member of the snap fastener and to be engaged by the female member.

GLENN W. SIMPSON.